April 11, 1950            R. ALKAN            2,504,061
GYROSCOPE ERECTOR SYSTEM
Filed March 11, 1944            2 Sheets-Sheet 1
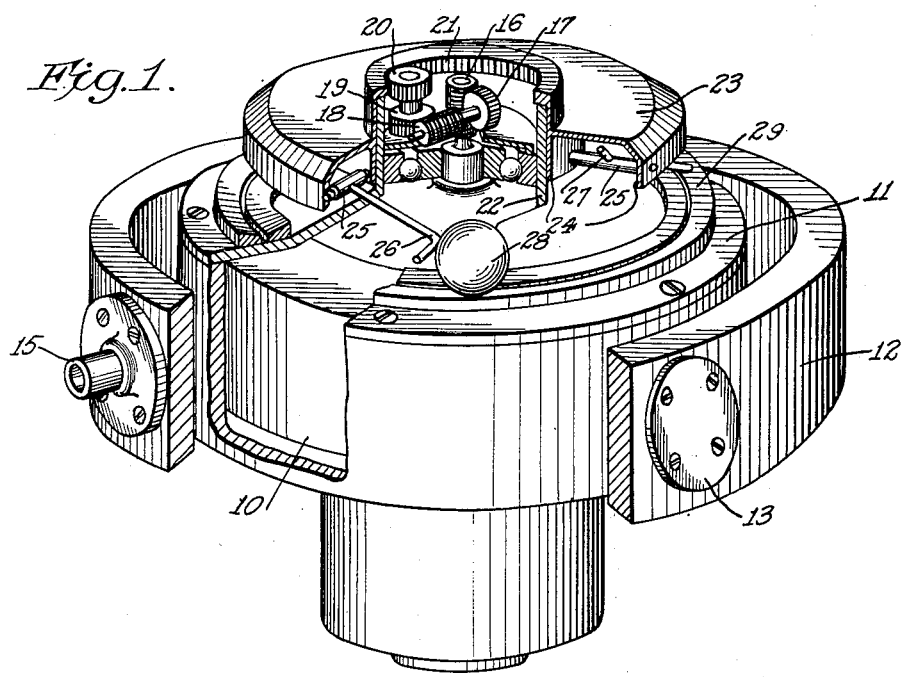
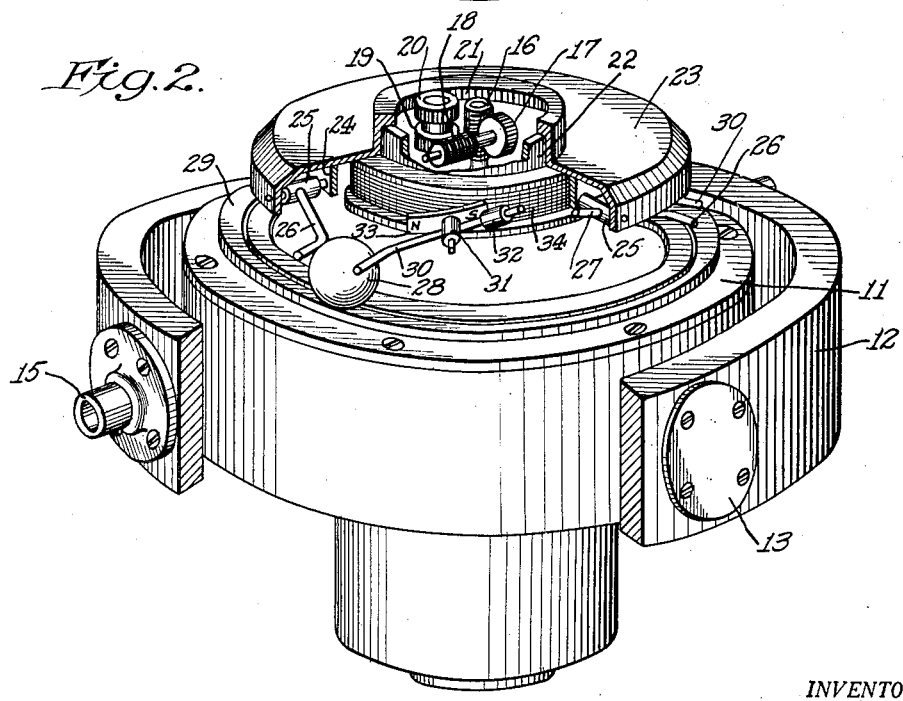
INVENTOR:
ROBERT ALKAN
BY
ATTORNEYS April 11, 1950   R. ALKAN   2,504,061
GYROSCOPE ERECTOR SYSTEM
Filed March 11, 1944   2 Sheets-Sheet 2

INVENTOR:
ROBERT ALKAN
BY
Hogent, Leavy Campbell
ATTORNEYS

Patented Apr. 11, 1950

2,504,061

UNITED STATES PATENT OFFICE 2,504,061

GYROSCOPE ERECTOR SYSTEM

Robert Alkan, Locust Valley, N. Y., assignor to Stephen A. McClellan, Glen Cove, N. Y.

Application March 11, 1944, Serial No. 526,075

5 Claims. (Cl. 74—5.44)

This invention relates to erector systems for gyroscopes, and has particular reference to self-erecting means of the gravity ball type for use on gyroscopic devices providing an artificial horizon on a mobile vehicle, such, for example, as an airplane, although the invention is not limited to that use.

Ball type erecting devices for maintaining the desired vertical position of the axis of a vertical spin axis gyroscope mounted for three degrees of freedom, for instance, are generally old, an example of such devices being illustrated in United States Patent No. 1,311,768, issued July 29, 1919, to J. and J. G. Gray. However, in such prior devices the movement of a ball for introducing the gravity erecting couple is limited in both directions to a corresponding sector defined by one or more positively positioned driving arms, so that lateral accelerations of the vehicle will cause irregular forces of erection since the ball is not free to roll immediately to the low point to correct the tilt sufficiently rapidly to render the instrument reliable for indicating the true vertical.

In accordance with the present invention, a ball type gravity erecting system for gyroscopes is provided in which a single ball is driven constantly in one rotary direction about the spin axis of the gyroscope by one of several equally spaced arms which are positive in their driving action in said direction, and may be displaced by a ball rolling in this same direction, but will not be displaced by a ball rolling in a direction opposite to its normal direction of motion when being positively driven by the arms. It is thus possible, particularly in instances where the ball platform is at a considerable angle from the horizontal, for the ball, when accelerated by gravity from the top of its travel, to roll ahead of its driving arm and to pass beyond at least one other driving arm. By this means the ball rests a shorter period of time at the bottom of its gravity travel than would be the case if it were to be required to await the arrival of the driving arm which released it at the top of its travel. The time spent at the bottom of the travel produces a couple, and corresponding precession, in an undesired direction. This method of decreasing the time that the ball is at rest or oscillating back and forth about the lowest position, decreases the average effect of this undesired couple and thereby reduces the spiral effect in the curve of erection for the gyro. Accordingly, the resulting time spent by the ball on the downward course, and the time spent in rest or in oscillatory motion at the bottom of the course, in comparison with the time spent on the uphill course, provide a more favorable restoring precession than is obtained by prior systems.

As a part of the invention, a lock-out gate operated at will is provided for each arm, so as to trap the ball between the arm then engaging the ball and the corresponding gate to render the ball immune to the action of gravity or the forces due to undesirable lateral accelerations, even though the gyro may be in such position that its plane of rotation is tilted. For example, during a turn of the airplane, it may be desirable to prevent free rolling of the ball by means of the gate cooperating with the corresponding ball advancing arm. The gates are arranged to be normally inactive and accordingly are retracted from the path of travel of the ball, so that under normal conditions the erecting system operates in the manner described in connection with the first embodiment. However, when desired, the operator or pilot may release the gates to effect their ball lockout function, preferably magnetically, or such release may be effected automatically by the turn indicator of the airplane, so that when it responds to a sharp turn the gates are closed to disable the ball. In a preferred arrangement each gate is balanced about its pivot in so far as gravity forces are concerned. In operation a permanent magnet coaxial with the gate arm holds the gate retracted so that it does not interfere with the operation of the ball, or moves it to the lock-out position, depending upon the relative polarity of the permanent magnet and the field of a coil concentric with the gyroscope axis, so that reversal of the current in the coil causes the magnet to move each gate into the path of travel of the ball and lock it out of action. In a modified form of lock-out mechanism, the gates are normally held retracted out of the path of the balls, and when released by manual or automatic deenergization of a retracting electromagnet, fall by gravity into ball lock-out position.

It will be seen that the present invention provides a simple and effective gravity erecting system for vertical gyroscopes, which eliminates the disadvantages of prior ball type erecting systems while retaining their advantages of simplicity and positiveness of action.

For a more complete understanding of the invention, reference may be had to the accompanying drawings, in which:

Figure 1 illustrates a perspective view of a gyro vertical embodying this invention with the erector ball driving head shown in section to illustrate the construction thereof;

Fig. 2 is a perspective view of a modification of the invention involving the use of magnetically operated ball lock-out gates cooperating with the ball advancing arms, the head of the instrument being shown in partial section to illustrate the construction of the gate operating means;

Figure 3:
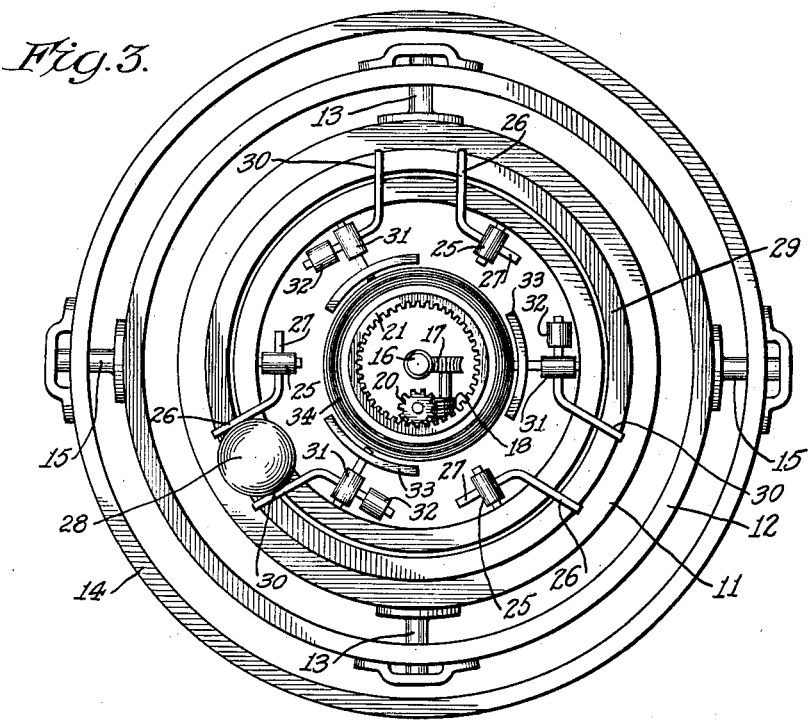
Fig. 3 is a plan view of the gyro vertical of Fig. 2, with the ball driving head and corresponding mechanism omitted to illustrate the construction and arrangement of the ball driving arms and the ball lock-out gates.

Referring to Fig. 1 of the drawing, numeral 10 designates a gyroscope, preferably electrically driven, although it may be air-spun, arranged for rotation about a normally vertical axis, and mounted in a Cardan suspension for angular movement about two mutually perpendicular horizontal axes normally lying in a plane at right angles to the spin axis, so that the gyroscope has three degrees of freedom. The rotor is mounted within the casing 11 and the aforementioned Cardan suspension comprises inner gimbal ring 12 on which the casing 11 pivots about axes 13, and an outer gimbal ring 14 shown in Fig. 3, on which inner gimbal ring 12 pivots about axes 15 arranged in a vertical plane at right angles to the plane of axes 13. Outer gimbal ring 14 is suitably supported on the airplane or other base, and preferably comprises the housing for the instrument, or at least the lower half thereof.

As shown in Figs. 1 and 3, the spin axis of the gyroscope is preferably extended from the top of the casing 11 and carries the worm 16, which meshes with a worm wheel 17 carrying the worm 18 meshing with a worm wheel 19, fixed on a vertically arranged shaft carrying at its upper end the spur pinion 20 which engages and thus drives an internal spur ring gear 21. The gearing just described constitutes a reduction gearing, whereby the internal ring gear 21 is driven at a rate materially less than the high spin rate of the gyroscope, and numerous tests have indicated that for the purpose desired, the rate of revolution of internal ring gear 21 should be a definite function of the kinetic momentum of the gyroscope.

Ring gear 21 is journalled on a tubular axial extension 22 of the casing 11 and carries a disc-like head 23 rotating therewith and having two concentric depending flanges 24 between which are pivoted three horizontal stub shafts 25 spaced 120° apart, each carrying a ball driving arm 26. The arms 26 are preferably formed of sufficiently heavy gauge wire to be stiff and the free ends are bent at substantially right angles, as shown, so as to extend normally to the direction of travel of the ball and engage the same with a substantially frictionless point contact. Each arm 26 is gravity-biased about its pivot 25 and is held in ball-engaging position by a stop 27 engaging the underside of head 23, as shown particularly in Fig. 1.

The ball 28 has substantial mass and rolls in a circular track 29 of generally V-shaped cross-section, suitably secured to the upper surface of gyroscope casing 11.

In operation of the arrangement of Fig. 1, the ball 28 is constantly driven in a counter-clockwise direction, as seen in Fig. 1, when one of the arms 26 is in engagement therewith, at the aforementioned relatively low rate of speed compared to that of the gyroscope rotor. This rate is such that the period of rest of a ball 28 at the lowest point of its path during a tilt of the gyroscope is brought within required limits.

When the gyroscope is level, the ball 28 is simply pushed around the track 29 at the indicated rate by whichever arm 26 it last passed in a downward course, before the gyro reached its latest position nearest the vertical. If the gyroscope tilts, say to the right, as seen in Fig. 1, ball 28 will roll away to the right from corresponding driving arm 26 on the left, and its momentum may carry it past the arm 26 ahead, which because of its pivot at 25, is lifted by the rolling ball 28 so that the ball passes that gate toward the low point of the tilted track 29.

The ball 28 is not permitted to remain for an appreciable length of time at the low point of the track 29 because it is quickly engaged by the following arm 26 and moved uphill as the arm advances. With this arrangement, the greatest reduction of the unfavorable precession at right angles is obtained, and the characteristic spiral action of approach of the axis to the vertical is greatly reduced. In fact the axis is restored to vertical position by movement in a virtually radial direction from its inclined position.

Figure 4:
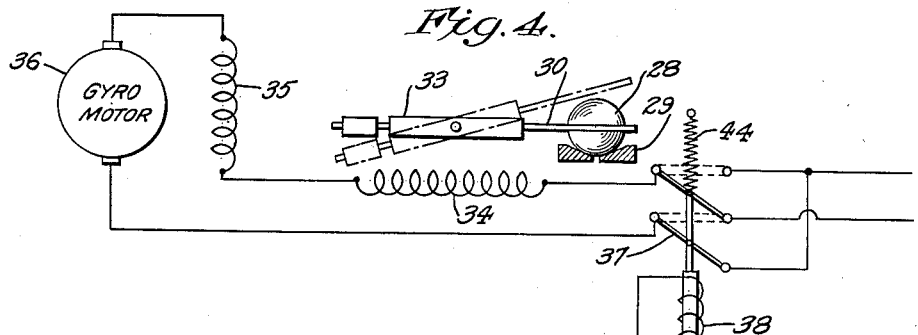
Fig. 4 is a schematic diagram of the preferred electrical connections for effecting activation of the ball lock-out gates.

Under some conditions of operation, such as during undesirable lateral accelerations which would unduly activate the erector ball 28, it is desirable to completely eliminate the erecting force until the relatively violent disturbing impulses or forces have subsided. To that end, the ball lock-out arrangement illustrated in Figs. 2, 3 and 4 is provided, and in its preferred arrangement three lock-out gates 30 similar in shape to driving arms 26 are provided and are so positioned with respect to the latter as to cooperate therewith to hold the engaging ball 28 in a fixed position relatively to arm 26, notwithstanding the driving action of the latter, which continues to roll the ball 28 in a counter-clockwise direction along track 29. Each lock-out gate 30 is preferably balanced about its pivot 31 by a counterbalance weight 32 so that gravity does not tend to move it in either direction.

Each gate 30 is preferably normally held raised in ball-disengaging position by magnetic means and also is operated magnetically to move into the position shown in Figs. 2, 3 and 4, to trap the ball 28 between it and the corresponding driving arm 26. This magnetic ball-engaging action of the gate 30 and its subsequent retraction may be effected either by the pilot or other operator, or automatically, in response to undesirable lateral accelerations, even though the gyro may be in the position that its plane of rotation is tilted.

Preferably the magnetic gate operating mechanism comprises a small permanent magnet 33 fixed to the pivot shaft 31 of gate 30 so as to turn with the gate 30. Magnet 33 lies in the field of a fixed coil 34, which may be mounted on tubular extension 22 of the casing 11, as shown in Fig. 2. When the current flows in coil 34 in the normal direction the magnet 33 will be tilted so that the gate 30 will be held in raised position shown by the dotted lines in Fig. 4. However, when the current is reversed through coil 34, magnet 33 tilts in the opposite direction and the gate will drop into lock-out position to block the ball 28 from free rotation away from corresponding arm 26. The coil 34 may be conveniently, although not necessarily, connected in series with the field winding 35 of the gyroscope motor 36, as shown in Fig. 4. Reversal of the field 35 of the series motor 36 in the manner described does not affect operation of the motor 36, although the reversal of the field of coil 34 causes the magnet 33 to tilt from the dotted line to the solid line position shown in Fig. 4.

In operation of the ball lock-out mechanism shown in Figs. 2, 3 and 4, the reversal of the current in coil 34 is effected to trap the ball 28 between gate 30 and corresponding arm 26. Reversal of the current in coil 34 may be effected by a reversing switch 37, either actuated manually or automatically. Automatic operation may be conveniently obtained by means of a relay 38 whose normally-closed circuit is opened to actuate the reversing switch 37 whenever the instrument is subjected to some undesirable lateral acceleration, such as a turn in the case of an airplane, which would result in violent and possibly erratic movement of the ball 28 owing to the sudden tilt of the gyroscope. Thus, if the instrument is mounted on an airplane, the pointer shaft 39 of the turn indicator 40 thereof may be provided with a cam 41 for displacing leaf spring 42 to open contacts 43 so as to deenergize the relay 38, in case of a turn of a predetermined degree of sharpness made by the airplane in either direction. In that event, reversing switch 37 is thrown to the position shown in dotted lines in Fig. 4 by the spring 44, and the current through coil 34 is accordingly reversed to cause gate 30 to be moved to the ball trapping position shown in Figs. 2 and 3. If the ball has begun to roll away from the arm that was driving it before the tilt and the corresponding gate 30 has not trapped it, the preceding arm 26 will be lifted by the rolling ball engaging it from behind and the ball will nevertheless be stopped by the gate ahead, whereas the arm just lifted by the ball will drop behind it to lock it between that gate and the dropped arm.

When the lateral acceleration detected by the turn indicator 40 has subsided it swings back to center position and its cam 41 releases spring 42 to close contacts 43, which reenergizes relay 38 to restore switch 37 to normal position, shown in solid lines in Fig. 4. The circuit through coil 34 is accordingly again reversed to cause magnet 33 to retract gate 30. Thereafter the ball erecting system effects self-erection of the gyroscope in the manner described in connection with Fig. 1.

Figure 5:
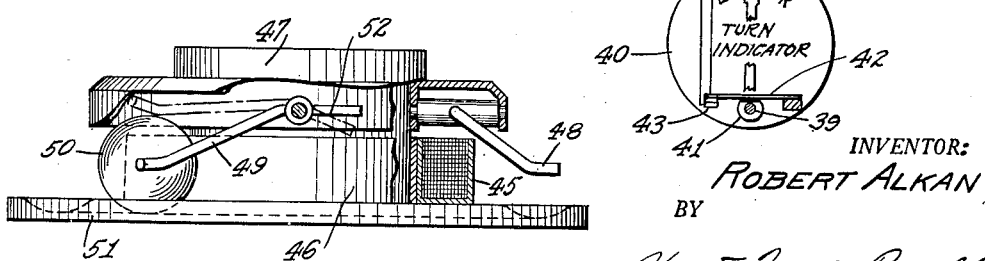
Fig. 5 is an elevation, partly in section, of a gyro vertical having a modified form of lock-out gate.

A modified form of ball lock-out mechanism is illustrated in Fig. 5, in which a fixed coil 45 similar to coil 34 in Figs. 2 and 3 is mounted on a tubular extension 46 of the gyro casing. Pivoted on the driven head 47 so as to rotate therewith and with ball-advancing arm 48 are the lock-out gates 49, one of three being shown. Each lock-out gate 49 cooperates with corresponding arm 48 to trap the ball 50 between them as it rolls on track 51. Fixedly connected to each lock-out gate 49 is an armature 52 which is located above and in the field of coil 45, which is normally energized so that the lock-out gate 49 is held retracted out of the path of the ball 50 as shown by the dotted lines in Fig. 5.

When the coil 45 is deenergized, either manually or automatically, as by opening of contacts 43 by the cam 41 of the turn indicator 40 shown in Fig. 4, the lock-out gate 49 drops by gravity into the position shown by the solid lines in Fig. 5, to lock the ball 50 between itself and the corresponding arm 48, as described. Reenergization of coil 45 causes armature 52 to be drawn downwardly and gate 49 upwardly out of the path of the ball 50. Equivalent means for operating gates 30, either electrically or manually, or both, may be provided. Thus a pendulum responsive to tilts of predetermined degree may be used to actuate and restore the lock-out gates, by opening and closing contacts in lieu of the turn indicator of Fig. 4, for example.

Although certain preferred embodiments of the invention have been illustrated and described herein, it is to be understood that the invention is not limited thereby but is susceptible of changes in form and detail within the scope of the appended claims.

I claim:

1. In a gravity erecting system for a vertical axis gyroscope having a casing, the combination of a circular stationary track on said casing concentric with the gyroscope axis, a ball rolling on said track, a head on said casing rotatable about said axis, means for continuously driving said head in one direction at a relatively low rate of speed compared to the speed of rotation of said gyroscope, a plurality of arms on said head normally projecting into the path of said ball for engaging the ball at one side to drive the same in said direction, and a pivot for each arm providing gravity movement of said arm downwardly into the path of said ball for driving engagement therewith and rendering the same displaceable upwardly by said ball about the pivot upon engagement thereof with the opposite side of said arm, whereby said ball is free to roll past said arm in said direction during tilt of said gyroscope.

2. In a gravity erecting system for a vertical axis gyroscope having a casing, the combination of a circular stationary track on said casing concentric with the gyroscope axis, a ball rolling on said track, a head on said casing rotatable about said axis, means for continuously driving said head in one direction at a relatively low rate of speed compared to the speed of rotation of said gyroscope, a plurality of arms on said head normally projecting into the path of said ball for engaging the ball at one side to drive the same in said direction, a gate on said head adjacent each arm and rotatable therewith, each gate being adapted to permit rearward movement of said ball but to prevent forward movement thereof, and means for retracting the gates to inoperative position.

3. In a gravity erecting system for a vertical axis gyroscope having a casing, the combination of a circular stationary track on said casing concentric with the gyroscope axis, a ball rolling on said track, a head on said casing rotatable about said axis, means for rotating said head, a plurality of arms on said head for engaging said ball to drive the same, a gate on said head adjacent each arm for trapping the ball between a gate and an arm, each gate being arranged to permit rearward movement of the ball but to prevent forward movement thereof and means for retracting said gates out of the path of said ball.

4. In an erector system for vertical axis gyroscopes, the combination of a relatively stationary, circular track co-axial with the gyroscope axis, a ball on said track, a plurality of arms normally extending into the path of the ball, and means for driving said arms in a forward direction around said axis to engage the ball and advance the same around said track, each arm being pivotally arranged to permit forward movement of the ball past the arm while preventing rearward movement of the ball past the arm.

5. In an erector system for vertical axis gyroscopes, the combination of a relatively stationary circular track coaxial with the gyroscope axis; a ball on said track; a plurality of arms normally extending into the path of movement of said ball; driving means for moving said arms forwardly around the axis of the gyroscope to engage the ball on one side and advance same around the track; and a pivotal support for each arm for permitting the arm to be displaced from out of the path of movement of said ball when the gyroscope axis is inclined from the vertical by pressure of the ball as it rolls forward against the rear side of the arm.

ROBERT ALKAN.

REFERENCES CITED

The following references are of record in the file of this patent:

UNITED STATES PATENTS

| Number | Name | Date |
|---|---|---|
| 1,934,774 | Sperry, Jr., et al. | Nov. 14, 1933 |
| 2,351,619 | Kimball | June 20, 1944 |

FOREIGN PATENTS

| Number | Country | Date |
|---|---|---|
| 14,032 | Great Britain | Oct. 4, 1915 |
| 161,595 | Great Britain | Apr. 21, 1921 |
| 221,006 | Great Britain | Sept. 1, 1924 |